United States Patent
Williams et al.

(10) Patent No.: US 12,328,642 B2
(45) Date of Patent: Jun. 10, 2025

(54) SYSTEM AND METHOD FOR COORDINATED BEAMFORMING AMONG DISCRETE COMMUNICATION DEVICES

(71) Applicant: THE BOEING COMPANY, Chicago, IL (US)

(72) Inventors: John Dalton Williams, Huntsville, AL (US); Ted R. Dabrowski, Huntsville, AL (US); Jae H. Kim, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 396 days.

(21) Appl. No.: 17/819,733

(22) Filed: Aug. 15, 2022

(65) Prior Publication Data
US 2024/0056769 A1    Feb. 15, 2024

(51) Int. Cl.
*H04W 4/029* (2018.01)
*G01S 13/46* (2006.01)
*H01Q 1/38* (2006.01)
*H04W 16/14* (2009.01)

(52) U.S. Cl.
CPC ........... *H04W 4/029* (2018.02); *G01S 13/46* (2013.01); *H01Q 1/38* (2013.01); *H04W 16/14* (2013.01); *G01S 2013/466* (2013.01)

(58) Field of Classification Search
CPC ... H04W 16/28; H04W 72/046; H04W 84/18; H04W 24/08; H04W 88/06; H04W 88/02; H04W 4/40; H04W 4/46; H04W 4/44; H04W 72/25; H04W 92/18
See application file for complete search history.

(56) References Cited

U.S. PATENT DOCUMENTS

| | | | |
|---|---|---|---|
| 2014/0301494 A1* | 10/2014 | Hsu | H04B 7/026 375/267 |
| 2015/0173034 A1 | 6/2015 | Rode et al. | |
| 2021/0297128 A1* | 9/2021 | Badic | G01S 5/0284 |

FOREIGN PATENT DOCUMENTS

CN    101640560 A    2/2010

OTHER PUBLICATIONS

Extended European Search Report received for related EP App. No. 23189653.1 dated Feb. 15, 2024 (7 pages).

* cited by examiner

*Primary Examiner* — Kwasi Karikari
(74) *Attorney, Agent, or Firm* — Philip S. Hof; The Small Patent Law Group LLC

(57) ABSTRACT

A communication system and method include a group of multiple, discrete communication devices, each including an isotropic antenna element and a controller. A role of a first communication device is master device, and the role of the other communication devices is follower device. The controller of the master device determines relative locations of the follower devices to the master device, and assigns different phase delay values to the communication devices based on the relative locations. The controller of the master device communicates message information including the phase delay values, a message payload, and a transmit time to the follower devices for the isotropic antenna elements of the communication devices to collectively form an antenna array that transmits the message payload at the transmit time. The antenna array transmits the message payload with a phase taper defined by the phase delay values to form a beam towards a target.

20 Claims, 3 Drawing Sheets

000
SYSTEM AND METHOD FOR COORDINATED BEAMFORMING AMONG DISCRETE COMMUNICATION DEVICES

FIELD OF THE DISCLOSURE

Embodiments of the present disclosure generally relate to antenna-based communication systems and methods.

BACKGROUND OF THE DISCLOSURE

The unceasing demands on wireless networks in support of increasingly bandwidth hungry applications is leading to a drastic change in the modern communication landscape. The need to support aggregate data transfer rates from tens to hundreds of Gigabits/sec (Gbps) has led to new approaches for efficient use of the spectrum using multi-antenna technology. Millimeter-wave (mm-wave) communications is an emerging technology for next generation communication systems with abundant bandwidth.

Portable communication devices, such as handheld smart phones and radios, typically have isotropic antenna elements that radiate in all directions. The antenna elements of such communication devices are not focused in any specific direction, so have limited ranges in which to reliably send and receive wireless messages. Typical cellular and other radiofrequency (RF) communication links include a tower-mounted beamforming transmitter that communicates to the portable communication devices. The transmitter on the tower includes a complex array of many antennas at predetermined, fixed positions, which allows for narrow beams and high gain. The tower transmitter can transmit messages to target receiver devices, such as portable communication devices, over large distances. But, tower transmitters with large antenna arrays may not be present in some environments, such as third-world countries, uninhabited wilderness, war zones, and/or the like. In such environments, the wireless communications between devices may be limited, constrained, or even unavailable.

One conventional tactic for extending the communication range of portable communication devices is to connect the communication device to a parabolic dish that can focus the RF energy towards an intended target. This tactic has several drawbacks, as it requires the presence of the dish hardware (e.g., that a person pack and carry the dish), that the dish is operable, that the person who possesses the dish is able to communicate messages from their communication device, and that the person who operates the dish is able to aim the dish towards the intended target. For example, the target may be out of the visual range and/or line of sight of the person, and the communications may be unsuccessful if the dish is not correctly aimed.

SUMMARY OF THE DISCLOSURE

A need exists for flexible systems and methods that generate communication links over long distances for reliable communications using portable communication devices without bulky and/or costly equipment.

With those needs in mind, certain embodiments of the present disclosure provide a communication system that includes a group of multiple, discrete communication devices. Each communication device includes an isotropic antenna element and a controller operably connected to the respective isotropic antenna element. A role of a first communication device in the group is master device, and the role of the other communication devices in the group is follower device. The controller of the master device is configured to determine relative locations of the follower devices to the master device, and assign different phase delay values to the communication devices based on the relative locations of the follower devices to the master device. The controller of the master device communicates message information including the phase delay values, a message payload, and a transmit time to the follower devices for the isotropic antenna elements of the communication devices to collectively form an antenna array that transmits the message payload at the transmit time. The antenna array transmits the message payload with a phase taper defined by the phase delay values to form a beam in a direction of interest towards a target.

Certain embodiments of the present disclosure provide method of forming an antenna array. The method includes determining relative locations of multiple communication devices designated as follower devices to a first communication device designated as a master device. Each of the follower devices and the master device includes an isotropic antenna element and a controller operably connected to the respective isotropic antenna element. The follower devices and the master device are portable and physically separate from one another. The method includes assigning different phase delay values to the communication devices based on the relative locations of the follower devices to the master device, and communicating message information including the phase delay values, a message payload, and a transmit time from the master device to the follower devices. The method includes transmitting the message payload at the transmit time, via the isotropic antenna elements of the master device and the follower devices, according to a phase taper defined by the phase delay values to collectively form a beam in a direction of interest towards a target.

Certain embodiments of the present disclosure provide a communication system that includes a group of multiple, discrete communication devices, each including an isotropic antenna element and a controller operably connected to the respective isotropic antenna element. At least some of the communication devices in the group are cellular phones that have 5G network capability. A role of a first communication device in the group is master device, and the role of the other communication devices in the group is follower device. The controller of the master device is configured to determine relative locations of the follower devices to the master device, and assign different phase delay values to the communication devices based on the relative locations of the follower devices to the master device. The controller of the master device is configured to communicate message information including the phase delay values, a message payload, and a transmit time to the follower devices. The controllers of the communication devices in the group are configured to transmit the message payload at the transmit time, via the respective isotropic antenna elements, according to a phase taper defined by the phase delay values, to collectively form a beam in a direction of interest towards a target.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION OF THE DISCLOSURE

Figure 1:
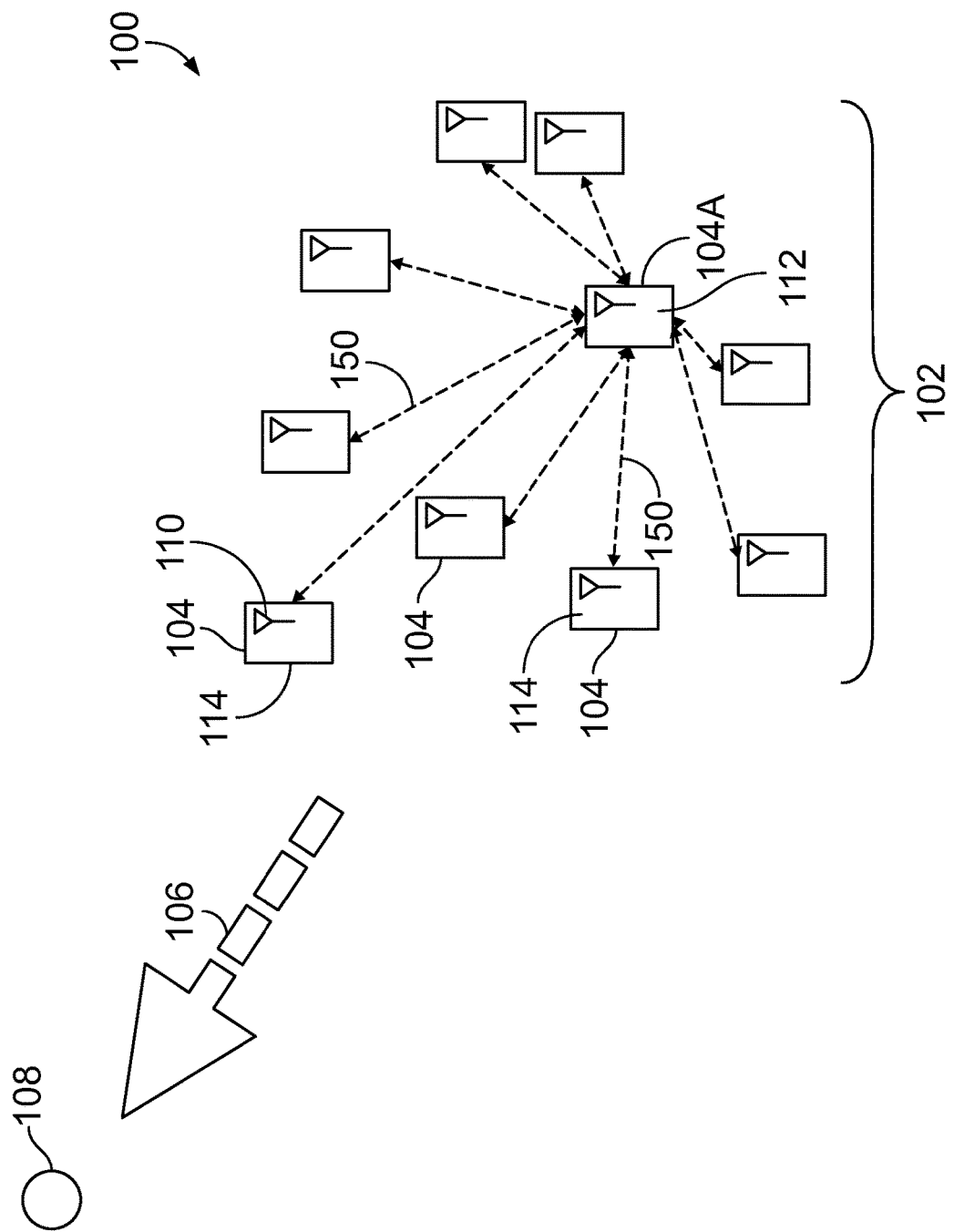
FIG. 1 illustrates a communication system according to an embodiment.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Examples of the present disclosure provide a communication system that is formed by a group of communication devices. The communication devices in the group are portable and mechanically separate, such that the communication devices are not tethered together or otherwise mechanically connected. The communication devices include isotropic antenna elements, which radiate in all directions. In various embodiments, the communications devices may be cellular phones (e.g., smart phones), radios, or the like. The communication devices may be carried by people, carried by robots, installed onboard aerial vehicles (e.g., unmanned aerial vehicles (UAVs)), installed onboard ground-based vehicles, and/or the like.

The communication devices coordinate with each other according to a device synchronization and beamforming algorithm described herein for the individual isotropic antenna elements to collectively function as an antenna array. The antenna array may be a phased array antenna that is controlled to steer or aim a beam, enabling message transmission and receipt over longer distances than would be possible using the communication devices individually without bulky and/or costly add-on hardware, such as parabolic dishes. Unlike conventional phased antenna arrays, the positions of the communication devices are not fixed relative to each other and are not known prior to initiation of the synchronization and beamforming algorithm. Because the communication devices are discrete, portable, and mechanically separate, the communications devices may have a random, varying arrangement in space. The embodiments described herein may create "ad hoc" local networks using the randomly-spaced communication devices. In one example, the system and method described herein may enable a collection of standard cellular phones to collaborate and send a phased coordinated transmission to a target to overcome a range limitation and/or a signal disruption, which foils direct communication between the cellular phones and the target.

The communication devices in one or more examples of the present disclosure may coordinate and synchronize with each other, to form the antenna array, using 5G cellular technology. For example, the communication devices may have 5G network capability. The multichannel capacity of 5G network capability may enhance synchronization and location-determining of neighboring devices. When synchronized in phase, the devices can send data much farther than a single radio can, without unduly draining battery charge or requiring additional hardware.

Examples described herein convert a group of portable communication devices into a distributed multiple-input and multiple-output (MIMO) network unit. The distributed MIMO network unit may provide a low size, weight, and power at cost (SWAP-C) communications solution that can operate on multiple frequency bands dynamically across a spectrum. In use, the distributed MIMO network may improve coordinated communication for ground tactical units and/or air tactical units to relay information over longer distances and higher data rates than conventional communication systems.

One or more embodiments may combine the adaptive beamforming used for distributed MIMO techniques with 5G radio technologies, which can have multiple channels with greater bandwidth than conventional 4G LTE (Long Term Evolution) spectrums. The use of 5G devices for the distributed MIMO application may improve channel diversity and availability, allowing for multiple synchronization channels that improve time and spatial coordination. In addition to synchronization channels, the 5G devices may also enable the use of one or more communication channels for improved long range signaling. The synchronization operations performed using a first set of channels in the 5G bandwidth may be concurrently performed with antenna array communication operations on a second set of one or more channels in the 5G bandwidth without interference. As such, synchronization between the communication devices may be performed in concert with long-range communication of the communication devices as a phased antenna array.

The device synchronization and beamforming algorithm described herein may be programmed on an application that is downloaded on one or more of the communication devices. A communication device designated as having a master device role may initiate the application, which causes the controller of the master device to identify and establish communication links with the other communication devices, referred to as follower devices. The controller of the master device may assign channels, synchronization links, network interfaces, and the like. More specifically, the master device may communicate with the follower devices in order to determine relative locations of the follower devices to the master device, and to assign phase delay values to the follower devices (and to itself) based on the relative locations of the follower devices. The phase delay values may also be assigned based on a location and/or direction from the group of communication devices towards an intended target. For example, the phase delay values are assigned with the goal of steering a beam, which results from superimposed radiation emanating from the isotropic antenna elements at a scheduled transmit time, towards the target. By coordinating time and phase among a plurality of discrete isotropic antenna elements, the collective antenna pattern may increase the range of successful communications by at least five or ten times the capability of a single one of the communication devices.

The system and method described herein can be used in a variety of different applications. Some specific use cases involve tactical units, such as S.W.A.T. teams, military squads or platoons, and the like, which involve a group of trained personnel on the ground to perform a mission. For example, the members of the tactical unit may have cellular phones that can be utilized according to the synchronization and beamforming algorithm to collectively generate long range communications without special hardware or undue power drain. Optionally, special antennas may be installed in one or more of the communication devices to allow the signal to be sent over a tactical communication channel for military support. Other specific use cases involve emergency operations, such as search and rescue operations and the like. For example, a team of first responders searching for a lost person in the woods may use the synchronization and beamforming algorithm to collectively generate long range communications for interacting with a dispatch/command post. In another specific use case, people that have the application on their phone and congregated in a crowd, such as at a theatre, sporting event, concert, or the like where network connections are hindered by the volume of devices, may use the algorithm to collectively accept network connectivity and boost signals. The embodiments presented herein are not limited to cellular phones and other devices carried by a person, and also apply to communication devices onboard vehicles. For example, the synchronization and beamforming algorithm can be used to communicate information from a group of aerial vehicles, such as UAVs (e.g., drones), to a dispatch facility, tower transmitter, and/or satellite. The algorithm can also be implemented by ground-based vehicles, such as a group of cars traveling near each other on a highway, to send and receive long-range communications about road construction, accidents, and/or the like.

FIG. 1 illustrates a communication system 100 according to an embodiment. The communication system 100 is formed by a group 102 of multiple individual communication devices 104. The communication devices 104 are discrete from one another, such that the devices 104 can stand alone and operate without being physically or mechanically connected to each other. For example, the discrete communication devices 104 may have independent power sources (e.g., batteries), controllers (e.g., processing circuitry), memory storage devices, and/or the like relative to one another, for independent functionality and operation. In one or more embodiments, the communication devices 104 are portable, such that the devices 104 are able to be moved relative to one another in different directions. The relative positioning of the communication devices 104 in the group 102 may vary over time as the devices 104 move, or are moved, in different directions.

The communication devices 104 in the group 102 coordinate and synchronize with each other to form an antenna array that wirelessly transmits a message (e.g., message payload) along a beam 106 towards a designated remote target 108. Each communication device 104 includes an isotropic antenna element 110 and a controller operably connected to the isotropic antenna element 110. For example, the isotropic antenna element 110 may be a component of a communication circuit that is electrically connected to the controller of the respective communication device 104. The controller of each communication device 104 controls the isotropic antenna element 110 to radiate radiofrequency (RF) energy according to instructions received from a designated master device in the group 102. Each isotropic antenna element 110 radiates energy in all directions. When synchronized to form the antenna array, each antenna element 110 of the discrete communication devices 104 represents a single antenna element, or tile, of a phased antenna array.

As opposed to conventional antenna arrays, the tiles formed by the isotropic antenna elements 110 of the communication devices 104 do not have fixed positions relative to one another. For example, the tiles in some conventional antenna arrays are arranged in orthogonal rows and columns with designated, uniform spacing between adjacent tiles. The spacing between tiles in fixed antenna arrays may be a function of the wavelength, such as a half wavelength. The communication system 100 forms an antenna array using the isotropic antenna elements 110 that have an arbitrary spacing and may be moving in different directions. In an embodiment, the communication system 100 accounts for positioning variability between the antenna elements 110 by determining the relative locations of the communication devices 104, and assigning different beamforming properties, such as phase delay values, to corresponding communication devices 104 based on the relative positioning. As the communication devices 104 may move over time, the communication system 100 may repeatedly perform the location determining process over time and update the beamforming properties that are assigned to the different devices 104 based on changes in relative locations of the devices 104 and/or a change in the location of the target 108.

A first communication device 104A in the group 102 is designated as having the role of master device 112. The other communication devices 104 in the group 102 have the role of follower or subservient device 114. The master device 112 may perform one or more of the operations of the communication system 100 to form the antenna array that radiates a beam in a direction of interest towards the target 108. For example, the controller of the master device 112 may establish communication links with the other communication devices 104 (e.g., the follower devices 114), communicate with the follower devices 114 to determine relative locations of the follower devices 114 relative to the master device 112, and assign different beamforming properties or parameters to the different communication devices 104 in the group 102 based on the relative locations. The controller of the master device 112 may communicate message information to the follower devices 114. The message information may include the assigned beamforming properties (including the phase delay values), the message that is to be transmitted remotely (referred to herein as the message payload), and a transmit time. The transmit time refers to a selected time at which the communication devices 104 will transmit the message payload according to the assigned beamforming parameters, including assigned phase delay values.

The group 102 of communication devices 104 may include one or more cellular phones (e.g., smartphones), tablet computers, wearable computer devices, radios, and/or the like. One or more of the communication devices 104 may be carried by a person or robot. The people that carry the communication devices 104 may be first responders (e.g., Police), tactical units, military units, and/or the like. For example, each of the communication devices 104 in FIG. 1 may be a personal device carried by a member of a tactical squad during a mission. Optionally, one or more of the communication devices 104 may be disposed onboard a vehicle, such as an aerial vehicle or a ground-based vehicle. For example, some or all of the communication devices 104 may be radios disposed onboard UAVs, radios disposed onboard automobiles, and/or the like. In an embodiment, some or all of the communication devices 104 in the group 102 have the capability to assume role of master device 112, although only one communication device 104 is the master device 112 at any given time. For example, the master device 112 in FIG. 1 may not have any additional hardware or software capabilities as one or more of the follower devices 114. Optionally, the communication devices 104 in the group 102 may all be off-the-shelf cellular phones.

The communication devices 104 in the group 102 may be located sufficiently close together to permit short-range wireless communications between the devices 104. For example, the devices 104 may communicate with each other through Bluetooth Low Energy or another communication protocol. Optionally, no two devices 104 in the group 102 may be greater than 100 m apart, greater than 50 m apart, or greater than 25 meters apart. Furthermore, the group 102 may include any number of communication devices 104. Ten communication devices 104 are shown in FIG. 1, but the communication system 100 described herein may function with fewer than ten devices 104 and with greater than ten devices 104. For example, the gain of the formed antenna array may be increased by utilizing a greater number of communication devices 104. The increased gain may extend the communication range and/or improve the signal to noise ratio (SNR).

The master/follower designation may be determined based on a pre-selected hierarchy that is stored onboard the devices 104. The hierarchy may be based on the rank and/or experience level of the users associated with the individual devices 104. For example, the devices 104 of higher-ranking users may be selected as the master device 112 prior to the devices 104 of lower ranking users. Alternatively, the roles may be determined based on whichever device 104 is the first to volunteer to serve as the master device 112. For example, a user of a communication device 104 may initiate an application on the device 104, where the application contains a synchronization and beamforming algorithm according to the embodiments described herein. The user may initiate the application in order to send a long-distance communication to the target 108. Optionally, the device 104 that is used to activate or initiate the synchronization and beamforming algorithm may automatically assume the role of master device 114. Alternatively, the application may present a graphical user interface (GUI) on a display of the device 104 that prompts the user of the device 104 to select whether the device 104 should be the master device 112, and may allow the user to identify another device 104 in the group 102 that should be the master device 112.

In an embodiment, the role of master device may be automatically re-assigned to one of the follower devices 114 in response to non-responsiveness of the master device 112 for at least a threshold amount of time. The master device 112 may send status updates or other messages to the follower devices 114 during normal operation to reassure the follow devices 114 that the master device 112 is operational. The follower devices 114 may use clocks to monitor the amount of time that has elapsed since the most recent status update (or other communication) received from the master device 112. The follower devices 114 may re-start the count after each new communication is received from the master device 112. If no communication is received from the master device 112 for greater than the threshold amount of time, that may indicate that the master device 112 is not operational. In response, the follower devices 114 may automatically assign the master role to one of the other communication devices 104. The follower devices 114 may select the new master device 112 based on a designated role hierarchy which ranks the communication devices 104. The role hierarchy may be a list of the communication devices 104. The next master device 112 may be the communication device 104 in the role hierarchy that follows the communication device 104 that was the most recent master device 112.

The target 108 may be a receiver device, such as a communication tower, a dispatch or control center, a communication relay device, a satellite, or the like. Alternatively, the target 108 may be a coverage area in which the communication system 100 is attempting scan and/or search. The target 108 may be located beyond the communication range of the individual communication devices 104 in the group 102. For example, the distance between the group 102 and the target 108 may be over 30 km, such as over 50 km, over 75 km, or even over 100 km. None of the communication devices 104 can reliably generate a beam for wirelessly communicating with the target 108 on its own without additional hardware, such as a parabolic dish, external amplifier, and/or the like. By coordinating the operation of the devices 104 in the group 102, the signals emanating from the plurality of isotropic antenna elements 110, at the assigned phase delay values, coincide and superpose in space to create the beam 106. The beam 106 permits the transmission of signals (e.g., messages) much farther than the devices 104 can accomplish individually. The beam 106 may permit the devices 104 to collectively transmit messages to the target 108. For example, the communication system 100 may enable successful message transmission of over 30 km, over 50 km, over 75 km, or even over 100 km, depending on the number and arrangement of the communication devices 104, the data rate, and/or the like. The phase delay values are assigned to steer the beam 106 in a direction of interest towards the target 108.

Figure 2:
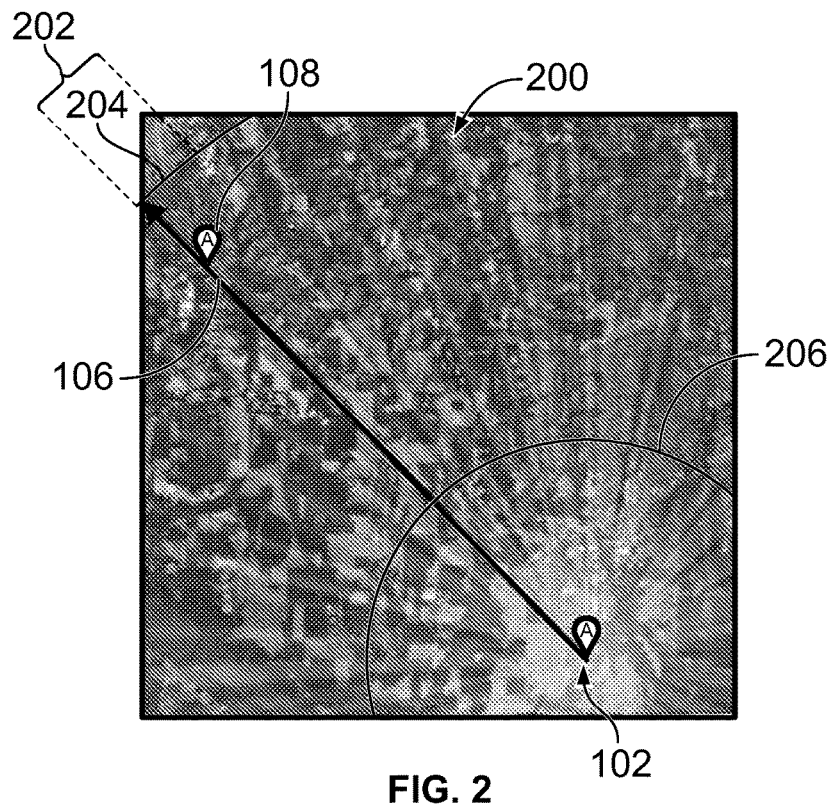
FIG. 2 illustrates a portion of an example antenna radiation pattern generated by a group of communication devices according to a synchronization and beamforming algorithm.

FIG. 2 illustrates a portion of an example antenna radiation pattern 200 generated by the group 102 of communication devices 104 (shown in FIG. 1) according to the synchronization and beamforming algorithm. Specifically, at the transmit time commanded by the master device 112, the communication devices 104 in the group 102 may all broadcast the same message payload, with different phase delay values as assigned by the master device 112. The isotropic antenna elements 110 of the communication devices 104 radiate RF energy in waves that interfere with one another in space. The phase delay values may be selected such that at least some of the waves constructively reinforce one another in the direction of interest towards the target 108 to form the beam 106.

The beam 106 may coincide with a first lobe 202 of the antenna radiation pattern 200. As shown in FIG. 2, the antenna radiation pattern 200 may have additional lobes that radially extend in other directions from the group 102. The beam 106 may direct energy a sufficient distance to encompass the target 108, such that the target 108 is within the bounds of the first lobe 202. The overlap of the target 108 by the lobe 202 indicates that the group 102 of communication devices 104 is able to successfully transmit a message to the target 108 by cooperating according to the synchronization and beamforming algorithm. The group 102 may have an extended communication range 204 that far surpasses a communication range 206 of the individual communication devices 104. The target 108 is outside of the communication range 206, such that the individual communication devices 104, acting in solo, are not able to communicate with the target 108. Depending on various factors, such as the number of communication devices 104 involved, the data rate, and the transmission power level of the communication devices 104, the extended communication range 204 of the group 102, according to the synchronization and beamforming algorithm, may be over 100 km. As such, the antenna array formed by the group 102 of communication devices 104 may be able to transmit a message payload along the beam 106 over 100 km. The extended communication range 204 may be a multiple of the communication range 206 of the individual devices 104, such as at least two times, at least three times, or at least four times the communication range 206. According to an embodiment, the extended communication range 204 is accomplished by synchronizing the efforts of multiple discrete communication devices 104 in the group 102 which may be arbitrarily spaced apart. The extended communication range 204 is achieved the use of bulky and/or costly equipment that is connected to one or more of the communication devices 104.

The master device 112 in the group 102 may command multiple coordinated message (e.g., signal) transmissions within a relatively short period of time to redirect the beam 106. The period of time may be less than 5 seconds, such as less than 2 seconds. The master device 112 may assign different phase delay values to the communication devices 104 for the different corresponding message transmissions during the time period in order to sweep the beam 106 for scanning purposes. The set of phase delay values assigned by the master device 112 for a given message transmission event is referred to as a phase taper. To provide the scanning function, the controller of the master device 112 may generate a first phase taper (e.g., a first set of phase delay values assigned to the communication devices 104) for a first message transmission event (e.g., a first transmit time). The controller of the master device 112 may also generate a second phase taper for a second message transmission event, which occurs at a second transmit time subsequent to the first transmit time, and so forth. Over time during the period, the variations in the phase tapers may affect the interference of the radiating waves in space, causing the beam 106 to move at least slightly over time in a controlled path through space. The master device 112 may assign or allocate a series of phase tapers associated with multiple different transmit times to cause the beam 106 to scan a target area during the time period.

Figure 3:
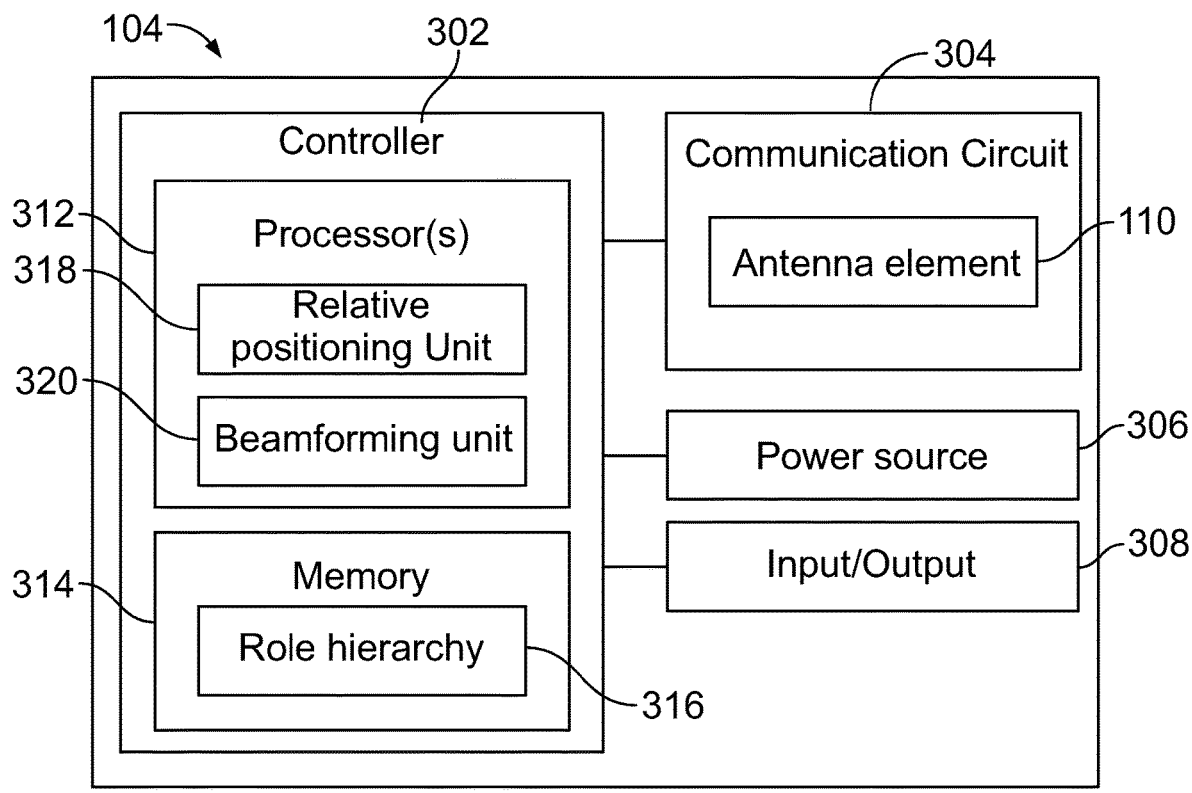
FIG. 3 is a block diagram of a communication device of the communication system according to an embodiment.

FIG. 3 is a block diagram of a communication device 104 of the communication system 100 according to an embodiment. The communication device 104 may represent any of the communication devices 104 in the group 102, such as the master device 112 or a follower device 114. In an embodiment, the communication device 104 in FIG. 3 is the master device 112, yet some or all of the follower devices 114 may have the same components of the master device 112 shown in FIG. 3. The communication device 104 includes a controller 302, a communication circuit 304 including the antenna element 110, a power source 306, and an input/output device 308. The controller 302 is operably connected to the other components via wired and/or wireless communication links to permit the transmission of information in the form of signals. For example, the controller 302 may generate control signals that are transmitted to the other components to control operation of the components. The components shown in FIG. 3 may be contained within and/or mounted on a housing or case. The communication device 104 may have additional components that are not shown in FIG. 3. In an alternative embodiment, the communication device 104 may lack one or more of the components shown in FIG. 3.

The controller 302 represents hardware circuitry that includes and/or is connected with one or more processors 312 (e.g., one or more microprocessors, integrated circuits, microcontrollers, field programmable gate arrays, etc.). The controller 302 includes and/or is connected with a tangible and non-transitory computer-readable storage medium (e.g., data storage device), referred to herein as memory 314. The memory 314 may store programmed instructions (e.g., software) that are executed by the one or more processors 312 to perform the synchronization and beamforming operations described herein. The programmed instructions may include one or more algorithms stored in the memory 314 and utilized by the one or more processors 312. References herein to the controller 302 may refer to the one or more processors 312.

The memory 314 may store one or more databases that contain information utilized by the one or more processors 312 to perform the synchronization and beamforming operations. In one example, the memory 314 may include a role hierarchy 316 that is an ordered list of the communication devices 104 of the group 102 for selecting subsequent master devices 112. The memory 314 may store additional information, such as various application program interfaces (APIs) that link to cloud hosting services, via the communication circuit 304, for accessing information from remote storage devices, such as servers.

The processor(s) 312 may include sub-units that implement different aspects of the synchronization and beamforming algorithm described herein. For example, a relative positioning unit 318 may determine the relative positions of the follower devices 114 to the master device 112 in space. The relative positions are then used by the processor(s) 312 to assign the different phase delay values. The processor(s) 312 may include a beamforming unit 320 that uses the relative positions of the follower devices 114 to the master device 112 to assign the different phase delay values in order for the collective antenna array to form the beam 106 directed towards the target 108. The units 318, 320 may represent sub-sets of the processors 312 and/or different functions performed by the processors 312.

The communication circuit 304 represents hardware circuitry that can communicate electrical signals via wireless communication pathways using the antenna element 110. The communication circuit 304 may include transceiving circuitry (e.g., a transceiver or discrete transmitter and receiver), one or more amplifiers, and the like, for wireless broadcasting of RF messages. In the synchronization and beamforming algorithm, the controller 302 may use the communication circuit 304 to communicate with the other communication devices 104 in the group 102 for synchronization purposes, as well as to transmit the message payload at the selected transmit time to form the aggregate beam.

The power source 306 may power the operations performed by at least some of the components of the communication device 104. For example, the power source 306 may supply electric current to power an amplifier of the communication circuit 304. The power source 306 may be a battery pack, one or more capacitors, or the like. The power source 306 may be rechargeable.

The input aspect of the input/output (I/O) device 308 may receive user inputs (e.g., selections) from a user that carries or at least interacts with the communication device 104. The I/O device 308 may include or represent a touch sensitive screen or pad, a mouse, a keyboard, a joystick, a switch, physical buttons, and/or the like. The user may actuate the I/O device 308 to generate input signals that are conveyed to the controller 102. For example, a user may initiate the synchronization and beamforming algorithm by activating, via the I/O device 308, an application stored on the communication device 104. The user may use the I/O device 308 to input instructions and/or commands, such as to input the contents of a message to send to a target device. The display aspect of the I/O device 308 may include a display screen that presents graphical indicia, such as images, shapes, text and symbols, for viewing by the user. The display screen may display a graphical user interface (GUI) of the application or website associated with the synchronization and beamforming algorithm.

Figure 4:
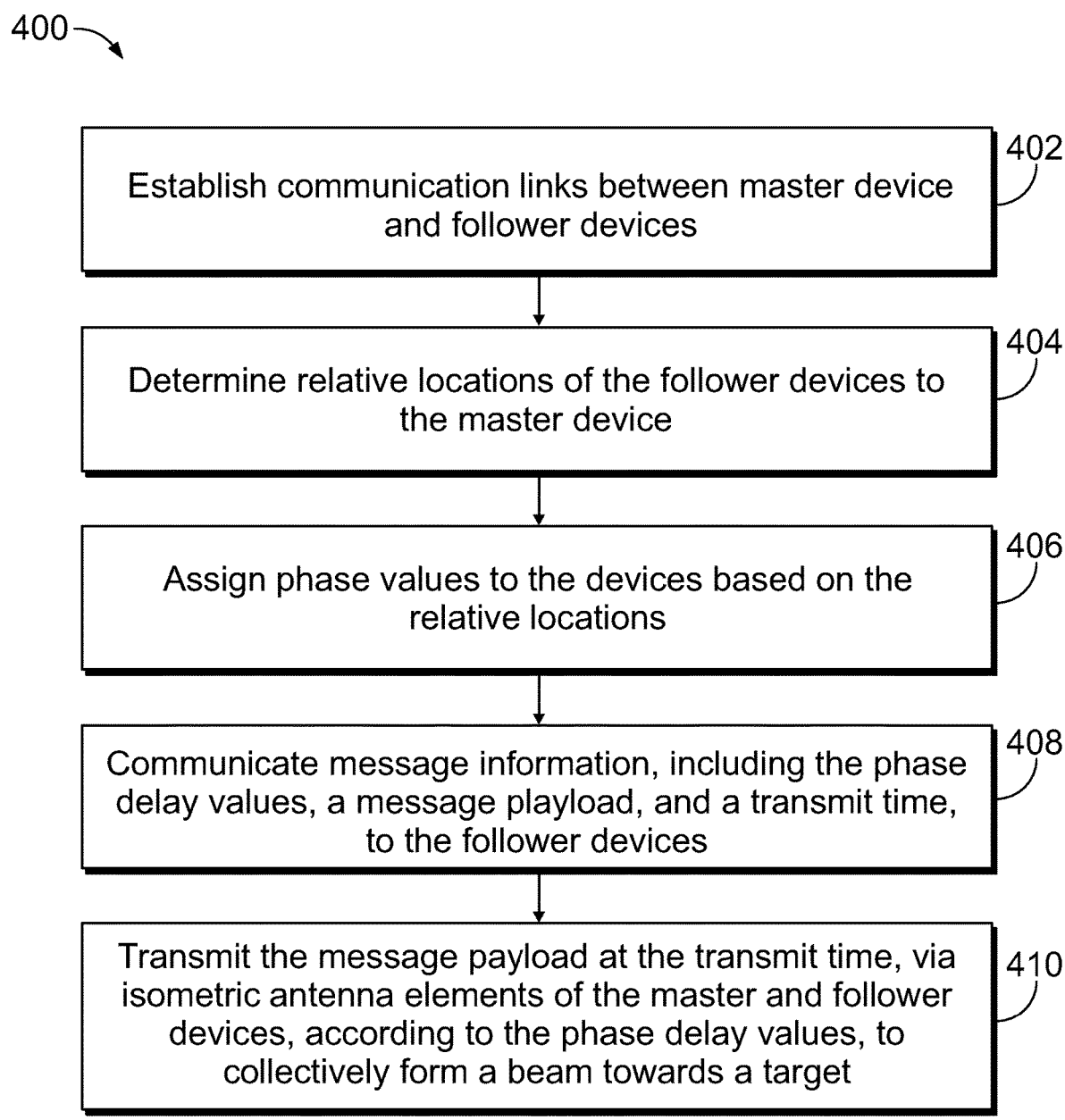
FIG. 4 is a flow chart of a method of forming an antenna array using isotropic antenna elements of separate and discrete communication devices according to an embodiment.

FIG. 4 is a flow chart 400 of a method of forming an antenna array using isotropic antenna elements of separate and discrete communication devices according to an embodiment. The method in FIG. 4 may describe the synchronization and beamforming algorithm described herein. The method may be performed, at least in part, by the controller 302 of the communication device 104 that is designated as the master device 112. The method optionally may include at least one additional step than shown, at least one fewer step than shown, and/or at least one different step than shown in FIG. 4.

At step 402, communication links are established between the master device 112 and the follower devices 114 in the group 102. For example, a user may initiate the method by activating a synchronization and beamforming application on one of the devices 104 and/or by inputting instructions, in that application or a website, to send a message to a remote target 108. The target 108 may be beyond the communication range 206 of the communication devices 104 individually. Upon initiation, the master device 112 may broadcast a beacon message in an attempt to identify the available follower devices 114 and establish communication links with those devices 114. The beacon message may include specific instructions to be implemented by the recipient devices 104 in order to participate in the antenna array formation as a follower device 114. For example, the instructions may command the receiving device to send a reply message back to the master device 112 that identifies the receiving device. The instructions may also command a manner in which to send the reply message, such as the frequency channel to use for this and/or future communications with the master device 114. Upon receipt of the reply messages from the available follower devices 114, the master device 114 may establish communication links with those follower devices 114. The communication links may specify the frequency channel(s) to use for communications between the devices 112, 114, a protocol to follow for the communications, and/or the like.

At step 404, the controller 302 of the master device 112 may determine the relative locations of the follower devices 114 to the master device 112. The relative locations may refer to the position of each follower device 114 in space relative to the position of the master device 112 in space. Because the communication devices 104 may be arbitrarily arranged, are not physically connected to one another, and may even be moving in different directions, the controller 302 may iteratively update the relative locations of the follower devices 114 over time on a continuous basis. The relative locations may be used by the controller 302 to determine the phase delay values to assign to the follower devices 114 for each scheduled message transmission event.

In one example, the controller 302 determines the relative locations by first determining linear distances 150 between the master device 112 and each of the follower devices 114. The linear distances 150 are shown as dashed lines in FIG. 1. The distances 150 may be determined, for example, based on time-of-flight approximations. The master device 112 may monitor the elapsed time from the initial transmission of an outgoing message to a respective follower device 114, to the receipt of a reply message from that follower device 114. The master device 112 may translate the elapsed time into a distance value based on an approximated speed of the signal waves through space. The follower devices 114 may also determine distances between one another. Once the distances are determined, the master device 112 may perform trilateration using the distance values to calculate the relative locations of the follower devices 114. Other techniques, such as triangulation, may be used in other embodiments. The relative locations may be characterized by coordinates in a coordinate system. The coordinate system may be two-dimensional, which assumes that all devices 104 are on a common plane, or three-dimensional.

In an alternative embodiment, the relative locations of the follower devices 114 to the master device 112 may be determined using location-determining sensors. For example, some or all of the communication devices 104 may include GPS receivers that enable determining GPS coordinates of the respective devices 104. The follower devices 114 may communicate their respective GPS coordinates to the master device 112. The master device 112 may compare its own GPS coordinates to the GPS coordinates of given follower device 114 to determine the relative location of that follower device 114 to the master device 112.

At step 406, the controller 302 of the master device 112 may generate a phase taper for the communication devices 104 based on the relative locations of the follower devices 114 to the master device 112. The phase taper includes a set of phase delay values that are assigned to the communication devices 104. For example, the controller 302 of the master device 112 may assign a first phase delay value to a first follower device 114 based on the relative location of the first follower device 114 to the master device 112. The controller 302 may assign a different, second phase delay value to a second follower device 114 based on the relative location of the second follower device 114 to the master device 112. The phase delay value assignments may also be based on the location of the target 108. At least some, and optionally all, of the phase delay values in the phase taper may differ from one another. The phase taper is generated such that when the individual communication devices 104 transmit the same message payload at the same transmit time, the antenna elements may radiate at slightly different phases in order to essentially steer the beam 106 that results from constructively-interfering RF waves. The master device 112 may assign a phase delay value to itself as well as to the follower devices 114.

At step 408, the controller 302 of the master device 112 may communicate message information to the follower devices 114. The message information concerns an upcoming transmission event, and may include the message payload to communicate, a transmit time at which to transmit the message payload, the assigned phase delay value of the phase taper, and/or the like. The same message payload and transmit time may be sent to all of the follower devices 114. Each follower device 114 may receive some information that is uniquely-associated with that follower device 114, such as the phase delay value assigned to that follower device 114. The message information may be communicated via one or more internal messages between the master device 112 and the follower devices 114.

At step 410, the communication devices 104 collectively transmit the message payload at the transmit time via the isotropic antenna elements of the individual devices 104. The master device 112 may transmit the message payload in addition to the follower devices 114. By synchronizing the transmission of the message payload, the isotropic antenna elements of the communication devices 104 collectively function as an antenna array that can communicate over greater ranges than the devices 104 individually. At least some of the message payloads transmitted by the communication devices 104 may vary from one another in terms of phase, which is attributable to the different assigned phase delay values. For example, the master device 112 may broadcast the message payload with a first phase delay value, and a first follower device 114 may broadcast the same message payload at the same time as the master device 112, but with a different, second phase delay value. The phase variance may enable steering a beam 106 that is formed in a direction of interest towards the remote target 108.

In an embodiment, the communication devices may utilize multiple different frequency channels to perform different aspects of the synchronization and beamforming algorithm. For example, synchronization and coordination among the communication devices 104, which involves local communication between the devices 104, may be performed on a first set of one or more frequency bands. As such, the controller 302 of the master device 112 may communicate the message information to the follower devices 114 on the first set of frequency bands, and may determine the relative locations of the follower devices 114 based on communications transmitted on the first set of frequency bands. The beamforming to collectively generate the beam 106 and transmit the message payload remotely to the target 108, according to the phase taper, may be on a second set of one or more frequency bands. The frequency band(s) in the second set may be discrete from (e.g., non-overlapping) the frequency band(s) in the first set. In an example application, a first frequency band or channel may be designated for time and frequency synchronization communications among the devices 104. A second frequency band or channel may be assigned for adaptive feedback-based synchronization efforts between the devices 104. A third frequency band or channel may be used by the master device 112 to communicate the assigned phase/timing delays to the follower devices 114, and may also be used by the follower devices 114 to send confirmation of message payload transmission to the master device 112 after the beamforming. A fourth frequency band or channel may be used to relay the message payload from the master device 112 to the follower devices 114 and to send a timing key that indicates the transmit time at which to transmit the message payload.

In an embodiment, the communication devices 104 in the group 102 have 5G network capability. The 5G network capability provides greater bandwidth than more conventional 4G LTE networks, and may accommodate partitioning various aspects of the algorithm onto different frequency bands (e.g., channels). For example, the 5G network settings on the devices 104 may enable the multi-channel operations described above. One of the benefits of the multi-channel operations is that different operations on different channels may be performed concurrently without interference, rather than sequentially. The communication system 100 may be able to synchronize the follower devices 114 (e.g., determine the relative locations and assign the phase delay values) at least partially concurrent with the beamforming and remote transmission of the message payload by the isotropic antenna elements operating as a phase antenna array. Performing these operations in concert may reduce the errors caused by changes in the relative positioning of the communication devices 104 in space.

Further, the disclosure comprises examples according to the following clauses:

Clause 1. A communication system comprising:
a group of multiple, discrete communication devices, each including an isotropic antenna element and a controller operably connected to the respective isotropic antenna element, wherein a role of a first communication device in the group is master device and the role of the other communication devices in the group is follower device, the controller of the master device configured to:
determine relative locations of the follower devices to the master device;
assign different phase delay values to the communication devices based on the relative locations of the follower devices to the master device; and
communicate message information including the phase delay values, a message payload, and a transmit time to the follower devices for the isotropic antenna elements of the communication devices to collectively form an antenna array that transmits the message payload at the transmit time, wherein the antenna array transmits the message payload with a phase taper defined by the phase delay values to form a beam in a direction of interest towards a target.

Clause 2. The communication system of Clause 1, wherein the communication devices in the group are portable and able to be moved relative to one another.

Clause 3. The communication system of Clause 1 or 2, wherein multiple communication devices in the group are cellular phones.

Clause 4. The communication system of any of Clauses 1-3, wherein multiple communication devices in the group are disposed onboard different aerial vehicles.

Clause 5. The communication system of any of Clauses 1-4, wherein the communication devices in the group have 5G network capability.

Clause 6. The communication system of any of Clauses 1-5, wherein the communication devices are configured to communicate with each other on a first set of one or more frequency bands for the controller of the master device to determine the relative locations and communicate the message information to the follower devices, and the communication devices are configured to transmit the message payload with the phase taper on a second set of one or more frequency bands, wherein the one or more frequency bands in the second set are discrete from the one or more frequency bands in the first set.

Clause 7. The communication system of any of Clauses 1-6, wherein responsive to the follower devices failing to receive a status update from the first communication device for at least a threshold amount of time from a most recent received status update, a second communication device in the group assumes the role of master device according to a designated hierarchy among the communication devices in the group.

Clause 8. The communication system of any of Clauses 1-7, wherein the transmit time is a first transmit time and the phase taper is a first phase taper, the controller of the master device configured to assign the phase delay values to the follower devices to define multiple different phase tapers associated with multiple different transmit times such that the beam that is formed scans a target area during a time period.

Clause 9. The communication system of any of Clauses 1-8, wherein the antenna array is configured to transmit the message payload along the beam for a distance that is over 100 km.

Clause 10. The communication system of any of Clauses 1-9, wherein the controller of the master device is configured to determine the relative locations of the follower devices to the master device via trilateration of distances between the master device and the follower devices.

Clause 11. A method of forming an antenna array, the method comprising:
  determining relative locations of multiple communication devices designated as follower devices to a first communication device designated as a master device, each of the follower devices and the master device including an isotropic antenna element and a controller operably connected to the respective isotropic antenna element, wherein the follower devices and the master device are portable and physically separate from one another;
  assigning different phase delay values to the communication devices based on the relative locations of the follower devices to the master device;
  communicating message information including the phase delay values, a message payload, and a transmit time from the master device to the follower devices; and
  transmitting the message payload at the transmit time, via the isotropic antenna elements of the master device and the follower devices, according to a phase taper defined by the phase delay values to collectively form a beam in a direction of interest towards a target.

Clause 12. The method of Clause 11, wherein the communication devices include one or more of cellular phones or aerial vehicles.

Clause 13. The method of Clause 11 or 12, wherein the communication devices have 5G network capability.

Clause 14. The method of any of Clauses 11-13, wherein determining the relative locations and communicating the message information is performed by the communication devices communicating with each other on a first set of one or more frequency bands, and transmitting the message payload according to the phase taper at the transmit time is performed by the communication devices on a second set of one or more frequency bands, wherein the one or more frequency bands in the second set are discrete from the one or more frequency bands in the first set.

Clause 15. The method of any of Clauses 11-14, wherein the transmit time is a first transmit time, the phase taper is a first phase taper, and the method further includes transmitting the message payload, via the isotropic antenna elements of the master device and the follower devices, according to multiple different phase tapers at different corresponding transmit times during a period such that the beam that is formed scans a target area during the period.

Clause 16. The method of any of Clauses 11-15, further comprising:
  responsive to the follower devices failing to receive a status update from the first communication device designated as the master device for at least a threshold amount of time from a most recent received status update, reclassifying one of the follower devices as the master device according to a designated hierarchy among the communication devices.

Clause 17. The method of any of Clauses 11-16, wherein determining the relative locations of the follower devices to the master device comprises determining respective distances of the follower devices from the master device and performing trilateration using the respective distances.

Clause 18. A communication system comprising:
  a group of multiple, discrete communication devices, each including an isotropic antenna element and a controller operably connected to the respective isotropic antenna element, wherein at least some of the communication devices in the group are cellular phones that have 5G network capability, wherein a role of a first communication device in the group is master device and the role of the other communication devices in the group is follower device, the controller of the master device configured to:
    determine relative locations of the follower devices to the master device;
    assign different phase delay values to the communication devices based on the relative locations of the follower devices to the master device; and
    communicate message information including the phase delay values, a message payload, and a transmit time to the follower devices,
  wherein the controllers of the communication devices in the group are configured to transmit the message payload at the transmit time, via the respective isotropic antenna elements, according to a phase taper defined by the phase delay values, to collectively form a beam in a direction of interest towards a target.

Clause 19. The communication system of Clause 18, wherein the controller of the master device is configured to determine the relative locations of the follower devices based on wireless signals communicated between the communication devices in the group on at least a first frequency band, and the controllers of the communication devices are configured to transmit the message payload at the transmit time on at least a second frequency band that is discrete from the first frequency band.

Clause 20. The communication system of Clause 18 or 19, wherein the communication devices in the group are portable and physically separate from one another.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A communication system comprising:
    a first communication device including an isotropic antenna element and a controller operably connected to the isotropic antenna element, wherein a role of the first communication device is master device and the first communication device is configured to communicate with other communication devices, that include respective isotropic antenna elements, to form a group of multiple, discrete communication devices, wherein the role of the other communication devices in the group is follower device, the controller of the master device configured to:
        determine relative locations of the follower devices to the master device;
        assign different phase delay values to different corresponding ones of the communication devices in the group based on the relative locations of the follower devices to the master device and based on a direction of interest from the group of communication devices towards a target; and
        communicate message information to the follower devices, the message information including the phase delay values, a message payload, and a transmit time, wherein the message information is communicated to control the isotropic antenna elements of the communication devices in the group to collectively form an antenna array that transmits the message payload at the transmit time and with a phase taper, defined by the phase delay values, to form a beam in the direction of interest towards the target.

2. The communication system of claim 1, wherein the communication devices in the group are portable and able to be moved relative to one another.

3. The communication system of claim 1, wherein multiple communication devices in the group are cellular phones.

4. The communication system of claim 1, wherein multiple communication devices in the group are disposed onboard different aerial vehicles.

5. The communication system of claim 1, wherein the communication devices in the group have 5G network capability.

6. The communication system of claim 1, wherein the controller of the master device is configured to communicate with the follower devices on a first set of one or more frequency bands to determine the relative locations and communicate the message information to the follower devices, and the communication devices are configured to transmit the message payload with the phase taper at the transmit time on a second set of one or more frequency bands, wherein the one or more frequency bands in the second set are discrete from the one or more frequency bands in the first set.

7. The communication system of claim 1, further comprising a second communication device in the group, wherein responsive to the second communication device failing to receive a status update from the first communication device for at least a threshold amount of time from a most recent received status update, the second communication device in is configured to assume the role of master device according to a designated hierarchy among the communication devices in the group.

8. The communication system of claim 1, wherein the transmit time is a first transmit time and the phase taper is a first phase taper, the controller of the master device configured to assign the phase delay values to the follower devices to define multiple different phase tapers associated with multiple different transmit times such that the beam that is formed scans a target area during a time period.

9. The communication system of claim 1, wherein the antenna array is configured to transmit the message payload along the beam for a distance that is over 100 km.

10. The communication system of claim 1, wherein the controller of the master device is configured to determine the relative locations of the follower devices to the master device via trilateration of distances between the master device and the follower devices.

11. A method of forming an antenna array, the method comprising:
    determining relative locations of multiple communication devices designated as follower devices to a first communication device designated as a master device, each of the follower devices and the master device including an isotropic antenna element and a controller operably connected to the respective isotropic antenna element, wherein the follower devices and the master device are portable, physically separate from one another, and form a group;
    assigning, via the controller of the master device, different phase delay values to different corresponding ones of the communication devices in the group based on the relative locations of the follower devices to the master device and based on a direction of interest from the group towards a target;
    communicating message information from the master device to the follower devices, the message information including the phase delay values, a message payload, and a transmit time; and
    transmitting the message payload at the transmit time, via the isotropic antenna elements of the master device and the follower devices in the group, with a phase taper defined by the phase delay values to collectively form a beam in the direction of interest towards the target.

12. The method of claim 11, wherein the communication devices in the group include one or more of cellular phones or aerial vehicles.

13. The method of claim 11, wherein the communication devices in the group have 5G network capability.

14. The method of claim 11, wherein determining the relative locations and communicating the message information is performed by the communication devices in the group communicating with each other on a first set of one or more frequency bands, and transmitting the message payload with the phase taper at the transmit time is performed by the communication devices in the group on a second set of one or more frequency bands, wherein the one or more frequency bands in the second set are discrete from the one or more frequency bands in the first set.

15. The method of claim 11, wherein the transmit time is a first transmit time, the phase taper is a first phase taper, and the method further comprises transmitting the message payload, via the isotropic antenna elements of the master device and the follower devices, with multiple different phase tapers at different corresponding transmit times during a period so that the beam that is formed scans a target area during the period.

16. The method of claim 11, further comprising:
responsive to the follower devices failing to receive a status update from the first communication device designated as the master device for at least a threshold amount of time from a most recent received status update, reclassifying one of the follower devices as the master device according to a designated hierarchy among the communication devices.

17. The method of claim 11, wherein determining the relative locations of the follower devices to the master device comprises determining respective distances of the follower devices from the master device and performing trilateration using the respective distances.

18. A communication system comprising:
a group of multiple, discrete communication devices, each including an isotropic antenna element and a controller operably connected to the respective isotropic antenna element, wherein at least some of the communication devices in the group are cellular phones that have 5G network capability, wherein a role of a first communication device in the group is master device and the role of the other communication devices in the group is follower device, the controller of the master device configured to:
determine relative locations of the follower devices to the master device;
assign different phase delay values to different corresponding ones of the communication devices in the group based on the relative locations of the follower devices to the master device and based on a direction of interest from the group of communication devices towards a target; and
communicate message information to the follower devices, the message information including the phase delay values, a message payload, and a transmit time,
wherein the controllers of the communication devices in the group are configured to transmit the message payload at the transmit time, via the respective isotropic antenna elements, with a phase taper defined by the phase delay values to collectively form a beam in the direction of interest towards the target.

19. The communication system of claim 18, wherein the controller of the master device is configured to determine the relative locations of the follower devices based on wireless signals communicated between the communication devices in the group on at least a first frequency band, and the controllers of the communication devices are configured to transmit the message payload at the transmit time on at least a second frequency band that is discrete from the first frequency band.

20. The communication system of claim 18, wherein the communication devices in the group are portable and physically separate from one another.

* * * * *